Patented Dec. 27, 1949

2,492,414

UNITED STATES PATENT OFFICE 2,492,414

PROCESS FOR PRODUCING METHYLOL
DERIVATIVES OF PYRROLE

Albert F. Chadwick, Westfield, N. J., assignor to
E. I. du Pont de Nemours & Company, Wilmington, Del., a corporation of Delaware No Drawing. Application May 1, 1948,
Serial No. 24,681

8 Claims. (Cl. 260—313)

This invention relates to the production of derivatives of pyrrole and, more particularly, it relates to the production of N-methylol pyrrole and 2,5-dimethylol pyrrole.

N-methylol pyrrole has been produced heretofore, J. A. C. S. 56, 1385 (1934), by reacting an aqueous solution of formaldehyde with pyrrole in ethyl alcohol in the presence of calcium hydroxide as a catalyst, extracting the N-methylol pyrrole with ether, and distilling the same to give a yield of N-methylol pyrrole of about 20%.

2,5-dimethylol pyrrole has been produced heretofore, J. Russ. Phys. Chem. Soc. 48, 748 (1916), by reacting an aqueous solution of formaldehyde with pyrrole in the presence of potassium carbonate as a catalyst. By following this procedure, a dark, resinous product is obtained from which a small yield, much less than 50%, of 2,5-dimethylol pyrrole can be extracted with an alcoholic solvent, for example, methanol or ethanol.

The two above-described processes are disadvantageous in that several days are required for completion of the reaction, and the reaction is accompanied by the undesirable formation of resins.

It is an object of this invention to provide an improved process for the production of N-methylol pyrrole and 2,5-dimethylol pyrrole.

It is another object of this invention to provide a process for the production of N-methylol pyrrole and 2,5-dimethylol pyrrole by which much larger yields can be obtained than by previously known processes.

Other objects of the invention will appear hereinafter.

The objects of this invention may be accomplished, in general, by reacting formaldehyde and pyrrole by the process which consists in mixing a substance taken from the group consisting of substantially anhydrous formaldehyde gas, paraformaldehyde, and alphapolyoxymethylene with pyrrole in the presence of certain alkaline catalysts, and maintaining the temperature of the mixture between 40° C. and 90° C.

The reaction is carried out in the presence of less than 5% by weight of water, based on the weight of the reactants. It is preferred that there be present no greater amount of water than that contained in paraformaldehyde (1%–7% based on the weight of the paraformaldehyde) or alpha-polyoxymethylene (0.1%–1.0%), and that contained in pyrrole, formaldehyde gas and the catalyst as a result of their contact with atmospheric conditions. In the case of some catalysts it may be necessary to have present a small amount of water to dissolve the catalyst. The reaction is, therefore, carried out under substantially anhydrous conditions.

As alkaline catalysts for the reaction, the following have been found to give highly desirable results; alkali metal hydroxides, for example sodium and potassium hydroxides; dibasic alkali metal carbonates, for example, sodium and potassium carbonates; tribasic alkali metal phosphates, for example, trisodium and tripotassium phosphates, and benzyl trimethyl ammonium hydroxide. Certain other alkaline substances, for example, calcium oxide, calcium hydroxide, and borax were found to promote resin formation and low yields of impure product and were, therefore, unsuitable as catalysts for the reaction. The quantity of catalyst used in carrying out the reaction may vary between wide limits, for example, between 0.01% and 10%, or more.

The N-methylol pyrrole and 2,5-dimethylol pyrrole will be formed within a considerable range of proportions of the reactants, pyrrole and formaldehyde. Molecular proportions of pyrrole to formaldehyde of between 3:1 and 1:3 may be employed. For the production of N-methylol pyrrole in optimum amounts, however, it is preferred that the pyrrole and formaldehyde be admixed in substantially equimolecular proportions. On the other hand, if it is desired to have optimum yields of 2,5-dimethylol pyrrole, it is preferred that the pyrrole and formaldehyde be admixed in the proportion of about one mole pyrrole to two moles formaldehyde. It is to be understood, of course, that the formaldehyde may be added either as paraformaldehyde, alpha-polyoxymethlyene, or substantialy anhydrous formaldehyde gas. If the latter is used as the source of formaldehyde, the pyrrole and the catalyst are preferably mixed together and the formaldehyde gas gradually passed therein, steps being taken to maintain the temperature during the reaction to between 40° C. and 90° C.

It it is desired to produce predominating amounts of N-methylol pyrrole, it is preferred that the reaction temperature be maintained at between 40° C. and 55° C. A temperature of at least 40° C. is necessary to carry out the reaction within a reasonable time, and at a temperature of 55° C. to 60° C. the N-methylol pyrrole will begin to be converted to 2,5-dimethylol pyrrole. If predominating amounts of 2,5-dimethylol pyrrole are desired, the reaction temperature is preferably maintained between 75° C. and 90° C.

The reaction between pyrrole and formaldehyde to produce N-methylol pyrrole takes place in accordance with the following equation:

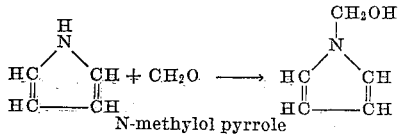

The 2,5-dimethylol pyrrole is apparently formed by a re-arranging and disproportionating of the N-methylol pyrrole to pyrrole and 2,5-dimethylol pyrrole as follows:

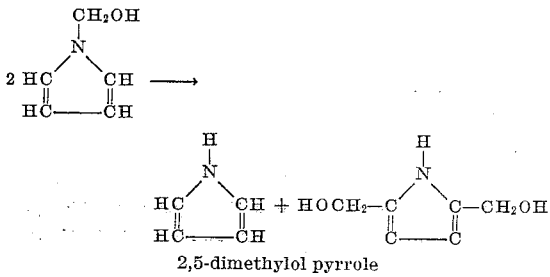

The reactions of this invention are preferably carried out in the substantial absence of air or oxygen. This may be accomplished by merely carrying out the reactions in a closed container, the small amount of air being present initially in the container not being of material importance. The reaction may, if desired, be carried out by blanketing the reactants with an inert gas, for example, nitrogen, carbon dioxide, or the like.

The N-methylol pyrrole may be separated from 2,5-dimethylol pyrrole and from the other products of the reaction or unreacted reactants in any desired manner, for example, by preferential solution or by vacuum distillation. In order to prevent conversion of N-methylol pyrrole to 2,5-dimethylol pyrrole, it is preferred to isolate the same from the reaction mass at the lowest possible temperature. Accordingly, the vacuum distillation should be carried out at a very low pressure, preferably at a pressure below 10 mm. of Hg. The more nearly perfect the vacuum, the higher the yield of the N-methylol pyrrole.

The 2,5-dimethylol pyrrole may be most readily isolated by crystallization from the reaction mass and purifying the same by recrystallization from a solvent, for example, from n-propyl alcohol.

The following examples are given to illustrate, in detail, certain preferred processes for the production of the methylol pyrroles of this invention. It is to be understood, however, that the invention is not to be limited by the details of these examples.

EXAMPLE I

*N-methylol pyrrole*

Anhydrous potassium carbonate (0.2 gram) was added to 30 grams (0.95 mole) of paraformaldehyde and 67 grams (1 mole) of pyrrole, and the mixture heated to 50° C. After 45 minutes, the paraformaldehyde dissolved and the reaction became exothermic so that it was necessary to use cooling to keep the temperature below 55° C. Two hours from the start of the reaction, all of the formaldehyde had reacted so the mixture was cooled and filtered. It was then vacuum distilled at 1.5–2.0 mm. Hg pressure. The product, which boiled at 55° C. to 60° C. at this pressure, weighed 53 grams which is a 57% yield based on the weight of the formaldehyde used. It melted at 19° C. to 27° C. The crystalline residue from the distillation weighed 26 grams and represented a yield of 21% of 2,5-dimethylol pyrrole. The combined yields of methylol pyrroles accounted for all of the formaldehyde initially present. Distilling the reaction mixture at a lower pressure or flash-distilling it should result in the isolation of more of the product as N-methylol pyrrole because the disproportionation to 2,5-dimethylol pyrrole would be reduced.

EXAMPLE II

*2,5-dimethylol pyrrole*

A mixture of 46.5 grams (1.5 moles) of paraformaldehyde, 50.5 grams (0.75 mole) pyrrole, and 0.2 gram of $K_2CO_3$ was heated to 50° C. in a nitrogen atmosphere with stirring. After about an hour, the paraformaldehyde dissolved and the reaction became exothermic. Cooling was used to keep the temperature from rising above 75° C. until the exothermic reaction was complete. The solution was then heated at 80° C. for two and one-quarter hours to complete the reaction. The product was heated in a vacuum (1–2 mm. pressure) for an hour to remove as much of the remaining pyrrole and N-methylol pyrrole as possible. It was then allowed to crystallize overnight. After drying by pressing between filter paper, the crude, yellow crystals (85 grams) represented an 89% yield of 2,5-dimethylol pyrrole. These crystals contained no water-insoluble resin and could be readily purified to give a colorless product (melting point 112° C. to 115° C. (uncorrected) by recrystallization from n-propyl alcohol.

EXAMPLE III

A reaction mixture containing 14.2 ml. pyrrole, 12.8 grams paraformaldehyde and 0.1 milliliter of a 40% aqueous solution of benzyl trimethyl ammonium hydroxide was heated to 50° C. and stirred until all of the paraformaldehyde had dissolved. Following this it was heated four hours at 70° C. and allowed to cool. The reaction mass was filtered to remove the crystals of dimethylol pyrrole. The dimethylol pyrrole crystals, after drying by pressing between pieces of filter paper, weighed 23 grams, which represents a 92% yield of crude product.

EXAMPLE IV

A reaction mixture composed of 13.4 grams pyrrole, 12.8 grams paraformaldehyde and 0.1 milliliter of 25% aqueous sodium hydroxide was heated to 50° C. until the paraformaldehyde had dissolved and then heated at 80° C. for two hours. After cooling, 15 grams of crystalline dimethylol pyrrole was obtained. This represents a yield of 60% of the theory.

EXAMPLE V

A mixture containing pyrrole and formaldehyde (in the form of paraformaldehyde) in a 1:2 molar ratio and trisodium phosphate dodecahydrate equal to 0.4% of the combined weight of pyrrole and paraformaldehyde was heated to 50° C. until the paraformaldehyde had dissolved. It was then heated at 75° C. for three hours. Upon cooling, a yield of crude crystalline dimethylol pyrrole equal to 80% of theory was obtained.

The N-methylol pyrrole and 2,5-dimethylol pyrrole of this invention have utility as cross-linking agents for casein and phenolic resins. They may be used particularly as resin-hardening agents in adhesives, brake-lining resins, grinding wheel resins, and the like.

The process of this invention has numerous advantages over previously known processes for the production of N-methylol pyrrole or 2,5-dimethylol pyrrole. Greater yields may be obtained in a shorter period of time. Moreover, the process of this invention is not subject to objectionable resin formation to the same degree as previously known processes for the production of the methylol pyrroles.

Throughout the specification and claims, any reference to parts, proportions, and percentages refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claims.

What is claimed is:

1. The process for the production of N-methylol pyrrole and 2,5-dimethylol pyrrole which comprises bringing into contact with pyrrole under substantially anhydrous conditions, a formaldehyde substance taken from the group consisting of substantially anhydrous formaldehyde gas, paraformaldehyde and alpha-polyoxymethylene in the presence of a catalyst taken from the group consisting of alkali metal hydroxides, alkali metal carbonates, tri alkali metal phosphates, and benzyl trimethyl ammonium hydroxide, and maintaining the temperature of the mixture between 40° C. and 90° C.

2. The process for the production of N-methylol pyrrole and 2,5-dimethylol pyrrole which comprises bringing pyrrole into contact with paraformaldehyde, under substantially anhydrous conditions, in the presence of a catalyst taken from the group consisting of alkali metal hydroxides, alkali metal carbonates, tri alkali metal phosphates, and benzyl trimethyl ammonium hydroxide, and maintaining the temperature of the mixture between 40° C. and 90° C.

3. The process for the production of N-methylol pyrrole and 2,5-dimethylol pyrrole which comprises passing substantially anhydrous formaldehyde gas into pyrrole, under substantially anhydrous conditions, in the presence of a catalyst taken from the group consisting of alkali metal hydroxides, alkali metal carbonates, tri alkali metal phosphates, and benzyl trimethyl ammonium hydroxide, and maintaining the temperature of the pyrrole between 40° C. and 90° C.

4. The process for the production of N-methylol pyrrole and 2,5-dimethylol pyrrole which comprises bringing into contact with pyrrole, under substantially anhydrous conditions, a formaldehyde substance taken from the group consisting of substantially anhydrous formaldehyde gas, paraformaldehyde, and alpha-polyoxymethylene in the proportion of 1 to 3 moles of formaldehyde to 1 to 3 moles pyrrole, in the presence of a catalyst taken from the group consisting of alkali metal hydroxides, alkali metal carbonates, tri alkali metal phosphates, and benzyl trimethyl ammonium hydroxide, and maintaining the temperature of the mixture to between 40° C. and 90° C.

5. The process for the production of N-methylol pyrrole which comprises bringing into contact with pyrrole, under substantially anhydrous conditions, a formaldehyde substance taken from the group consisting of substantially anhydrous formaldehyde gas, paraformaldehyde, and alpha-polyoxymethylene in the presence of a catalyst taken from the group consisting of alkali metal hydroxides, alkali metal carbonates, tri alkali metal phosphates, and benzyl trimethyl ammonium hydroxide, and maintaining the temperature of the mixture between 45° C. and 55° C.

6. The process for the production of N-methylol pyrrole which comprises bringing into contact with pyrrole, under substantially anhydrous conditions, a formaldehyde substance taken from the group consisting of substantially anhydrous formaldehyde gas, paraformaldehyde, and alpha-polyoxymethylene in substantially equimolecular proportions in the presence of a catalyst taken from the group consisting of alkali metal hydroxides, alkali metal carbonates, tri alkali metal phosphates, and benzyl trimethyl ammonium hydroxide, and maintaining the temperature of the mixture between 45° C. and 55° C.

7. The process for the production of 2,5-dimethylol pyrrole which comprises bringing into contact with pyrrole, under substantially anhydrous conditions, a formaldehyde substance taken from the group consisting of substantially anhydrous formaldehyde gas, paraformaldehyde, and alpha-polyoxymethylene in the presence of a catalyst taken from the group consisting of alkali metal hydroxides, alkali metal carbonates, tri alkali metal phosphates, and benzyl trimethyl ammonium hydroxide, and maintaining the temperature of the mixture between 75° C. and 90° C.

8. The process for the production of 2,5-dimethylol pyrrole which comprises bringing into contact with pyrrole, under substantially anhydrous conditions, a formaldehyde substance taken from the group consisting of substantially anhydrous formaldehyde gas, paraformaldehyde, and alpha-polyoxymethylene in the proportion of about 2 moles formaldehyde to 1 mole pyrrole in the presence of a catalyst taken from the group consisting of alkali metal hydroxides, alkali metal carbonates, tri alkali metal phosphates, and benzyl trimethyl ammonium hydroxide, and maintaining the temperature of the mixture between 75° C. and 90° C.

ALBERT F. CHADWICK.

REFERENCES CITED

The following references are of record in the file of this patent:

UNITED STATES PATENTS

| Number | Name | Date |
|---|---|---|
| 2,306,924 | Zerweck et al. | Dec. 29, 1942 |